UNITED STATES PATENT OFFICE.

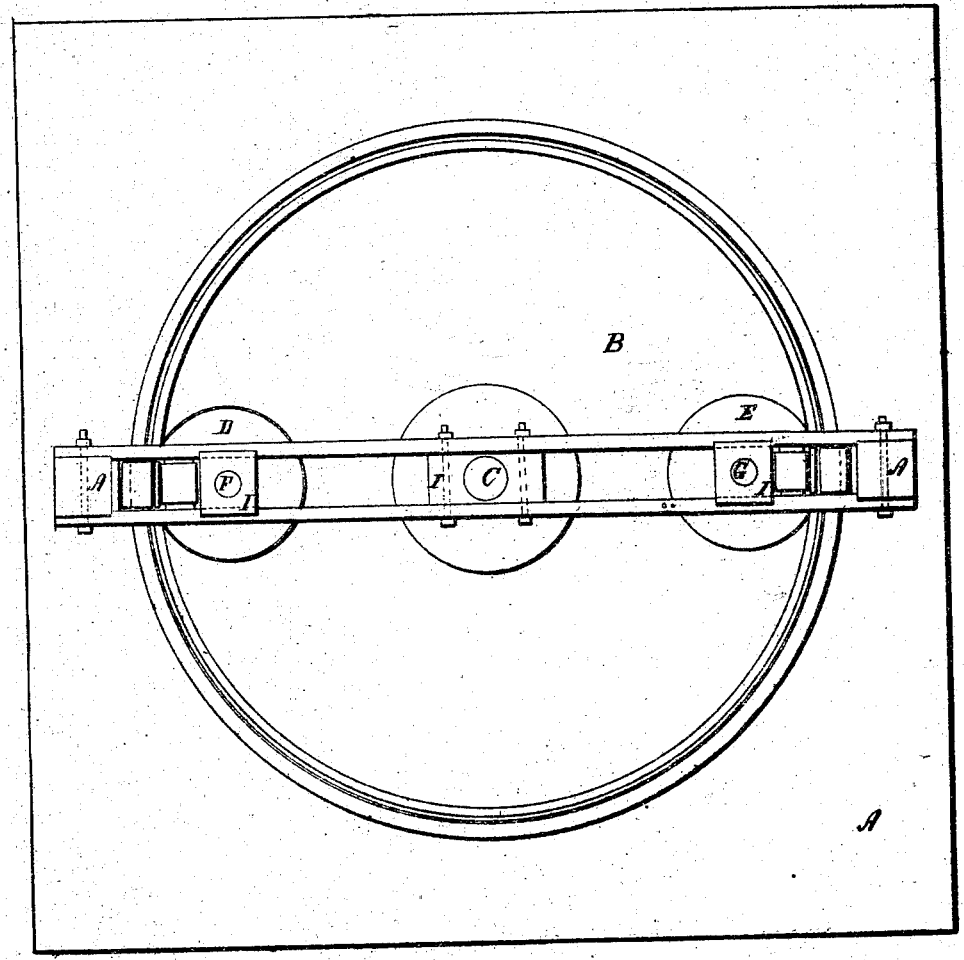

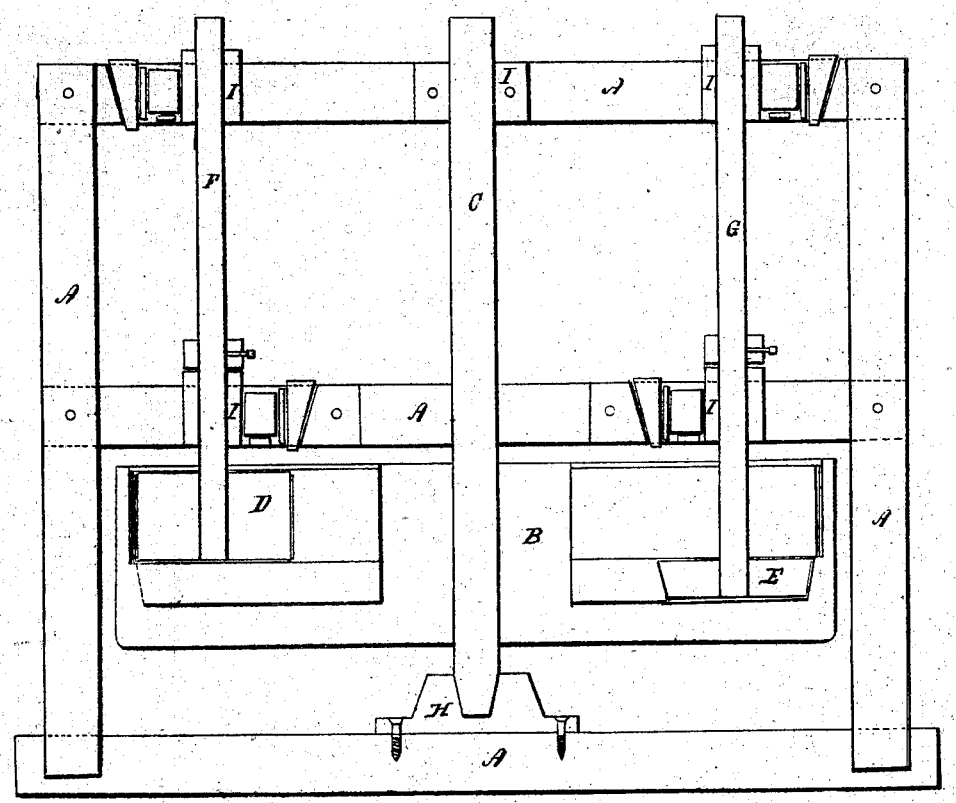

SMITH W. BULLOCK, OF ELIZABETH, NEW JERSEY, ASSIGNOR TO THE BULLOCK ORE DRESSING MACHINE COMPANY OF NEW YORK.

IMPROVED AMALGAMATING-PAN.

Specification forming part of Letters Patent No. 48,480, dated June 27, 1865.

*To all whom it may concern:*

Be it known that I, SMITH W. BULLOCK, of Elizabeth, in the county of Union, State of New Jersey, have invented a new and Improved Amalgamating-Pan; and I do hereby declare the following to be a full and exact description thereof, reference being had to the accompanying drawings and the letters of reference marked thereon.

To enable others skilled in the art to make and use my invention, I will proceed to describe its construction and operation, reference being had to the accompanying drawings, in which like letters represent like parts in each figure.

Figure 1 is a top view. Fig. 2 is a cut section vertically through the center.

In the drawings, A represents five pieces of wood, constituting a frame to support and hold the various parts of the machine in their respective and relative positions; B, a cast-iron pan with center hub; C, a shaft secured to the frame A in journal-boxes, as shown in drawings; D, a roller with an elastic jacket; E, a plate or disk attached to shaft; F, a shaft to which the roller D is attached; G, a shaft to which the plate E is attached. H is a step-plate to receive the shaft C. I I are journal-boxes attached to wood frame to support shafts C, F, and G.

I make the frame A of wood or other material, sufficiently large and heavy to receive and support the pan B and shafts C, F, and G. I make the pan B of iron or other material, six feet in diameter, more or less, and twelve inches deep, more or less, with a center hub fitted to receive the shaft C. The shaft C is fitted into the hub of the pan B and secured there by keys or set-screws, or otherwise, at a short distance from the lower end, and the shaft placed in the journal-boxes on the center of the frame A. I also prepare a step-plate, H, about one foot square, with a recess in the center to receive the lower end of the shaft C, and secure it to the bottom part of the frame A, as shown upon the drawings. I now place the shaft F, with the roller D attached, into the journal-boxes upon one side of the frame, so as to bring the roller D within the pan B; and suspend the shaft in the boxes by a collar upon the shaft, so as to bring the roller D within three inches (more or less) of the bottom of the pan B. I then place the shaft G, with the plate E attached, in the journal-boxes on the other side of the frame, so as to bring the plate within and against the inside and near the bottom of the pan B. I now attach the box-caps J J to the frame A, so as to secure the journal-boxes in their proper places. These caps are sufficiently large to allow a rubber spring to be placed in beside the box for the purpose of forcing the box (with shaft and plate or roller attached to it) against the inside of the pan with sufficient force to turn or rotate them by friction as the pan is turned, and yet allow them to spring off in case any hard substance should pass between them and the inside of the pan. The roller D also has a rubber or other elastic jacket over the outside. The inside of the outer rim of the pan B is lined with a plate of amalgamated copper, of the width of the roller D, and placed in position in the pan so as to bear against the roller only. The machine is now complete.

Operation: I put my amalgamator in operation by placing a common machine-belt around the outside of the pan, and passing it over a common belt-pulley, which is being driven by some motive power of sufficient speed to give the pan twenty turns per minute, more or less.

The object sought to be obtained by the use of this machine is the separation of the precious metals from the gangue, rock, or other substances with which they may be found. I therefore put into this pan ten pounds of quicksilver, more or less, and then run into the pan the sand or ground ore containing the metal, mixed up with water sufficient to hold it in suspension, and set the pan in motion, as before described, and continue to run in the ground ore and water until the pan is nearly full. The rotary motion of the pan gives a rotating motion to the plate E, and the roller D, the face of the plate being set near the bottom of the pan, by its cycloidal motion or tracing over the surface gives the material a rubbing or scouring as it passes under it or between it and the rim of the pan, producing a different effect from the common roller. The roller D collects the floating particles of gold or silver and of the quicksilver by its rotary motion, and presses it hard against the copper plate. The quicksilver upon the copper plate is kept clean and free from any oxide or dirt by the continual pressure of the elastic jacket upon the roller D, so that all the gold, silver, copper, and quicksilver that passes between the roller and the plate becomes immediately attached to the plate in the form of amalgam, while the gangue and dirt are washed away by the water. The particles of gold that are of sufficient specific gravity to precipitate to the bottom of the pan are rubbed into the quicksilver by the plate E in the form of amalgam, while the dirt is washed away, and thus a separation is effected.

The roller D and the plate E may be so arranged as to be driven by gear or blank wheels or pulleys attached to the shafts F and G, and to the pan B, or on a wheel prepared for the purpose and attached to the shaft C, instead of the pan, and of such relative diameters as to give the roller D and the plate E a greater or less speed than they would have if simply driven by friction against the pan.

What I claim in the foregoing specification as new, and desire to secure by Letters Patent of the United States, is—

1. The arrangement of the shafts of the plate E and of the roller D in a vertical position, or nearly so, in connection with the pan B, for the purposes set forth.

2. The application of the springs to the boxes I I, for the purposes described.

3. The application of gear or blank wheels or of band pulleys to the shafts C, F, and G and to the pan B, for the purposes herein set forth.

4. The application of an elastic coating or jacket to the roller D, in combination with an amalgamated plate of copper or other metal, for the purposes herein set forth, each of the several features being arranged substantially as and for the purposes described.

SMITH W. BULLOCK. [L. S.]

Witnesses:
 THEO. J. ALLEN,
 THOS. L. DALTON.